United States Patent
Siebert

(10) Patent No.: US 9,727,058 B2
(45) Date of Patent: Aug. 8, 2017

(54) SYSTEM FOR DETERMINING THE POSITION OF A VEHICLE, VEHICLE THEREWITH, AND METHOD THEREFOR

(75) Inventor: Ralf Siebert, Hoevelaken (NL)

(73) Assignee: 2 GETTHERE B.V., Utrecht (NL)

( * ) Notice: Subject to any disclaimer, the term of this patent is extended or adjusted under 35 U.S.C. 154(b) by 73 days.

(21) Appl. No.: 13/579,787

(22) PCT Filed: Feb. 21, 2011

(86) PCT No.: PCT/EP2011/052489
§ 371 (c)(1),
(2), (4) Date: Oct. 16, 2012

(87) PCT Pub. No.: WO2011/101462
PCT Pub. Date: Aug. 25, 2011

(65) Prior Publication Data
US 2013/0027225 A1   Jan. 31, 2013

(30) Foreign Application Priority Data

Feb. 19, 2010   (EP) ..................................... 10154159

(51) Int. Cl.
*G05D 1/02*   (2006.01)

(52) U.S. Cl.
CPC ................................. *G05D 1/0261* (2013.01)

(58) Field of Classification Search
CPC . B62D 6/00; B62D 1/28; B62D 1/283; B62D 5/0466; B62D 5/0481; G08G 1/042; G08G 1/017; G08G 1/065; G05D 1/0272

USPC ........ 340/436, 933, 937, 903, 905; 701/207, 701/23–27, 41; 318/580, 587; 180/167–169

See application file for complete search history.

(56) References Cited

U.S. PATENT DOCUMENTS

| | | | | |
|---|---|---|---|---|
| 4,908,557 | A * | 3/1990 | Sudare | G05D 1/0261 180/168 |
| 5,191,528 | A * | 3/1993 | Yardley | G05D 1/0261 180/168 |
| 5,204,814 | A * | 4/1993 | Noonan | A01D 34/008 180/168 |
| 5,347,456 | A * | 9/1994 | Zhang | G05D 1/0261 180/168 |
| 5,369,591 | A * | 11/1994 | Broxmeyer | G05D 1/0261 180/167 |
| 5,783,944 | A * | 7/1998 | Rakijas | G01V 3/08 324/207.22 |
| 6,208,268 | B1 * | 3/2001 | Scarzello | G08G 1/042 324/174 |
| 6,336,064 | B1 * | 1/2002 | Honkura | G01C 21/26 180/167 |
| 6,512,978 | B2 * | 1/2003 | Suzuki | G01C 21/26 180/168 |
| 7,451,027 | B2 * | 11/2008 | Peteri | B62D 1/28 180/167 |
| 8,676,426 | B1 * | 3/2014 | Murphy | G05D 1/0265 180/167 |

(Continued)

*Primary Examiner* — An T Nguyen
(74) *Attorney, Agent, or Firm* — Banner & Witcoff, Ltd.

(57) ABSTRACT

A system for determining the position of a vehicle includes a plurality of sensors for measuring the magnetic field strength of a magnet, means and is configured for determining the position of the magnet with respect to a plurality of sensors wherein the plurality of sensors are arranged in a two-dimensions array.

18 Claims, 3 Drawing Sheets

(56) References Cited

U.S. PATENT DOCUMENTS

| | | | | |
|---|---|---|---|---|
| 8,761,987 | B2* | 6/2014 | Olinger | G05D 1/0261 180/168 |
| 2002/0047709 | A1* | 4/2002 | Fling | G01V 3/104 324/326 |
| 2003/0029345 | A1* | 2/2003 | Tiernan | B82Y 25/00 102/221 |
| 2004/0074685 | A1* | 4/2004 | Tham | G05D 1/0261 180/168 |
| 2005/0015187 | A1* | 1/2005 | Peteri | B62D 1/28 701/41 |
| 2009/0128139 | A1* | 5/2009 | Drenth | G01R 33/02 324/207.22 |
| 2012/0330491 | A1* | 12/2012 | Olinger | G05D 1/0261 701/23 |
| 2013/0027225 | A1* | 1/2013 | Siebert | G05D 1/0261 340/933 |

\* cited by examiner

SYSTEM FOR DETERMINING THE POSITION OF A VEHICLE, VEHICLE THEREWITH, AND METHOD THEREFOR

FIELD OF THE INVENTION

The present invention relates to a system for determining the position of a vehicle.

The invention further relates to a vehicle comprising such a system.

The invention also relates to a method for determining the position of a vehicle.

BACKGROUND OF THE INVENTION

Systems for determining the position of a vehicle are known for many years. One such known system makes use of a grid of magnets that is provided in the surface whereon the vehicle moves. The system comprises a plurality of sensors that are able to sense the strength of a magnetic field. The plurality of sensors is arranged in a lateral direction of the vehicle, in order to ensure that a magnet arranged in the ground surface is detected when the vehicle passes over the magnet. The signals from the sensors are periodically sampled and provided to computation means to calculate the position of the sensed magnet with respect to the sensors. The described detection of magnets is usually not sufficient to determine the position, as individual magnets can normally not be distinguished from each other. Therefore, in one prior art system, rotational counters are installed on at least two wheels to keep track of the wheel rotation in order to determine a position change and therewith the position. The detection of the magnets prevents the occurrence of an accumulation of errors in the determination of the position and therefore position drift.

A drawback of this known system is that when the vehicle negotiates a bend, the sensors at the outer side of the bend are undersampling the magnetic field strength, while the sensors at the inner side of the bend are oversampling the magnetic field strength. Although the latter causes less problems with the processing power available to present day digital signal processors, the former causes a deterioration of the accuracy of the determined position when the vehicle negotiates a bend.

BRIEF SUMMARY OF THE INVENTION

The object of the present invention is to provide a system for determining the position of a vehicle, wherein the deterioration of the accuracy when the vehicle negotiates a bend, is substantially less compared to the described prior art.

This object is realised by the present invention by providing a system for determining the position of a vehicle comprising: a plurality of sensors for measuring the magnetic field strength of a magnet; computation means for determining the position of the magnet with respect to the plurality of sensors; wherein the plurality of sensors are arranged in a two-dimensions array.

In the system according to the prior art, the acquisition of samples from the sensors is fixed in time and the position of the samples in the space domain is dependent on and varies with the movement of the vehicle. In the present embodiment the plurality of sensors no longer solely serves to prevent missing a magnet when a magnet passes underneath the vehicle off-centerline, but serves to take a complete snapshot in two-dimensional space of the magnetic field of the magnet. To this end it is preferable that the array of sensors is arranged substantially parallel to the surface comprising the magnets, when the system is in use. This way determining the position of the magnet with respect to the sensors does not depend on any time related sampling rate and therefore the movement of the vehicle, but solely on the sensor arrangement. Because the determining of the position is independent of the vehicle movement, also the accuracy of the determined position is independent of the vehicle movement. This way undersampling and oversampling cannot occur, not when travelling in a substantially straight line, nor when negotiating a bend. The accuracy (for determining a single position) is fixed by the sensors' arrangement.

In a further embodiment, the present invention provides a system, wherein the sensors are evenly interspaced in both dimensions. This way the samples are evenly spaced.

According to another embodiment, a system is provided, further comprising means for fitting the magnetic field strengths measured by the plurality of sensors to a spatial model of the magnetic field of a magnet. Although computationally expensive, fitting the acquired magnetic field strengths to a spatial model of a magnet, results in high accuracy positions.

In a further embodiment, the present invention provides a system, wherein the sensitivity of the sensors for a magnetic field component perpendicular to the plane wherein the plurality of sensors are arranged is substantially higher than the sensitivity for magnetic field components parallel to this plane. Such an embodiment has the advantage that inaccuracies due to spatial variations in the earth's magnetic field are minimised, as this perpendicular component can be considered constant within a typical action radius of a surface bound vehicle. In a further embodiment, the system estimates a constant background magnetic field and compensates during the measurement of the magnets for this constant background field. This background field may constitute a magnetic field caused by components of the vehicle itself, but also a remaining perpendicular component of the measured magnetic field of the earth.

In again a further embodiment, the present invention provides a vehicle comprising a system as described above.

In a further embodiment, the system is arranged such that the positions of multiple magnets are determined from a single measurement by the two-dimensional array of sensors. In order for this feature to be advantageous, the magnets in the surface are to be arranged sufficiently close in order for the array to detect at least part of the magnetic fields of the multiple of magnets.

In again a further embodiment, the system is arranged to decode information that is coded by means of a mutual arrangement of a group of magnets in the surface and/or the polarity of the individual magnets in a group of magnets. To that end, it is preferred to arrange the magnets in clusters, wherein each cluster of magnets provides position information or for deriving position information analogous to the description of the previous embodiments, and wherein the arrangement of magnets in the cluster and/or the polarity of magnets in the cluster provides additional information, either additional positional information, or non-positional information. In one particular embodiment, position coordinates are directly encoded in the mutual arrangement. However, in a preferred alternative arrangement, the mutual arrangement encodes for a key for a lookup table that is stored in the vehicle. In accordance with another aspect of the present invention, a method is provided for determining a position of a vehicle, comprising the steps of: acquiring from a plurality of sensors, the magnetic field strengths measured by the sensors; determining the position of a sensed magnet with respect to the plurality of sensors; wherein the plurality of sensors are arranged in a two-dimensional array.

According to another aspect of the invention a method is provided, wherein the position of a sensed magnet is determined by fitting the acquired magnetic field strengths to a spatial model of the magnetic field of a magnet.

BRIEF DESCRIPTION OF THE SEVERAL VIEWS OF THE DRAWINGS

Further embodiments and advantages thereof will be described below with reference to the accompanying drawings, wherein.

DETAILED DESCRIPTION OF INVENTION

Figure 1:
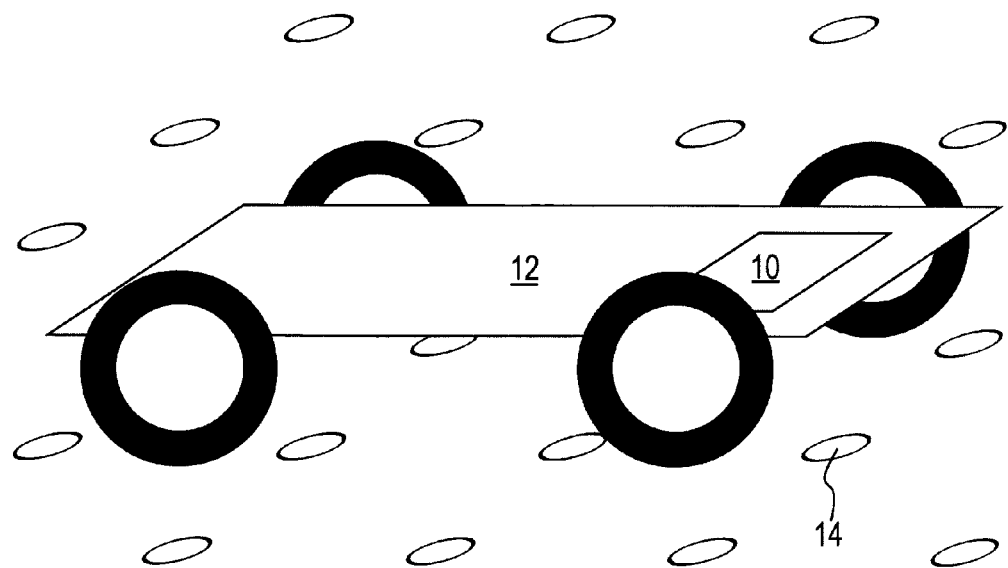
FIG. 1 shows a vehicle according to the present invention.
Figure 2:
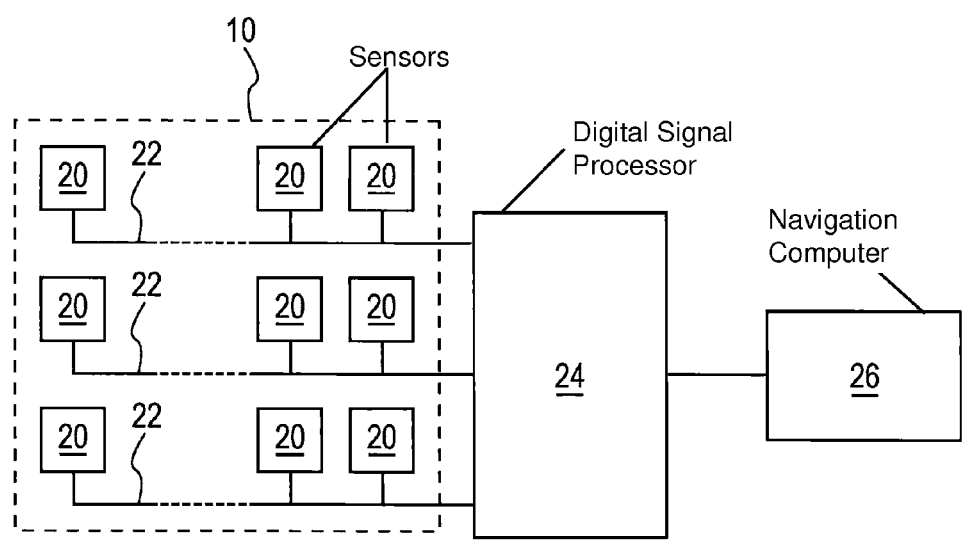
FIG. 2 shows a system according to the present invention that is comprised in the vehicle of FIG. 1.

Further embodiments and advantages thereof will be described below with reference to the accompanying drawings, wherein:

When a magnetic marker element 14 passes under a certain minimum number of sensors 20, the position of the vehicle 12 relative to the magnetic marker element 14 can be estimated. The minimum number of sensors required can be obtained by means of, for example, the Fisher Information Matrix. The magnetic field generated by the magnetic marker element 14 is sensed in one or more of the magnetic sensors 20. The magnetic sensors 20 are connected to a digital signal processor (DSP) 24. The DSP 24 fits the signals coming from the magnetic sensors 20 to a 3-dimensional model of the magnetic field of a magnetic marker element 14. From the fitted model, the position of the magnetic marker element 14 is obtained relative to the array 10 of magnetic sensors. Consequently, from a known position of a magnetic marker element 14, the position of the vehicle 12 is obtained, which is done by the navigation computer 26.

The position of the magnetic marker elements 14 is shown in FIG. 1 as a grid-like pattern. For the present invention, it is not necessary for the pattern of magnetic marker elements 14 to be grid-like. It is sufficient if the position of the magnetic marker elements 14 is known. A regular pattern like the grid-like pattern in FIG. 1 is advantageous though, as no position of individual marker elements need to be stored, as the positions are easily derivable from the pattern. In one particular embodiment the vehicle travels along a predetermined path, and the grid is a one dimensional grid that extends along the predetermined path.

The pattern of the magnetic sensors 20 is not bound to any specific pattern either. In principle, the pattern could be random, as long as the position estimation algorithm takes the location of the individual magnetic sensors 20 within the array into account.

Figure 3:
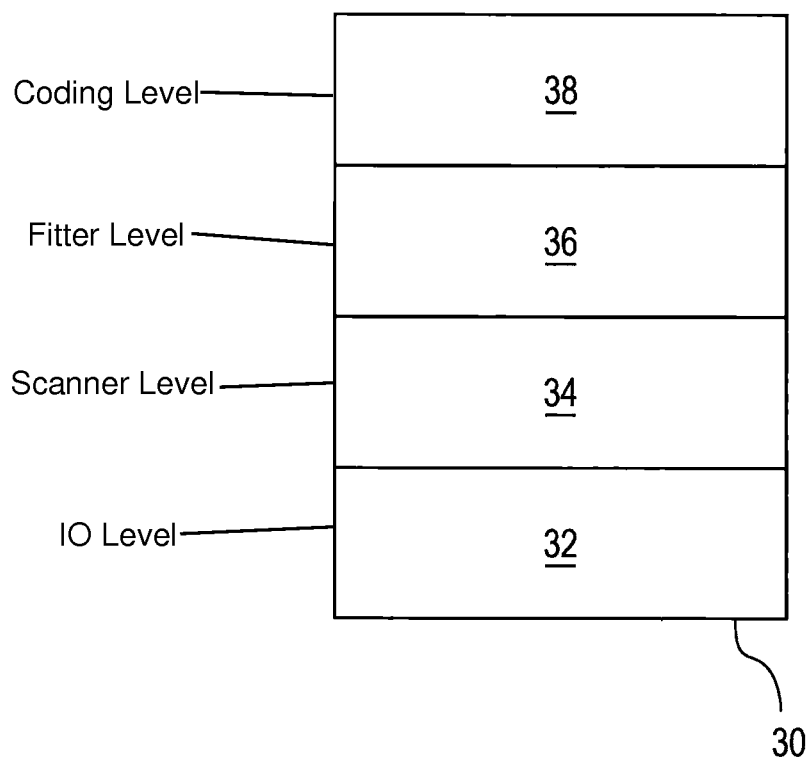
FIG. 3 shows a hierarchy for data-processing produced by a system according to the present invention.

The hierarchical functionality 30 provided by the DSP 24 and the navigation computer 26 is the following (FIG. 3): the lowest level is the 10 level 32. The 10 level 32 is responsible for obtaining the magnetic field strength readouts from the sensors 20.

In the next level, the scanner level 34, a position within the array 10 of sensors 20 is associated with each individual magnetic field strength measurement. As these positions are fixed in two-dimensions, this activity is rather straightforward in contrast to the embodiments from the prior art, that only employ magnetic sensors in a single dimension, as time does no longer play a role.

Subsequently, the set of magnetic field strength positions is fitted in a fitter-level 36 to a 3-dimensional model of a magnetic marker element 14. This results in an estimated position of the magnetic marker element 14 relative to the array 10 of sensors 20.

Finally, the estimated relative position of the magnetic marker element 14 is used in the last level, the coding level 38, to determine the position of the vehicle 12. In one particular embodiment the position is related to a particular moment in time, for example as a time elapsed since the occurrence of a time synchronisation signal.

Figure 4:
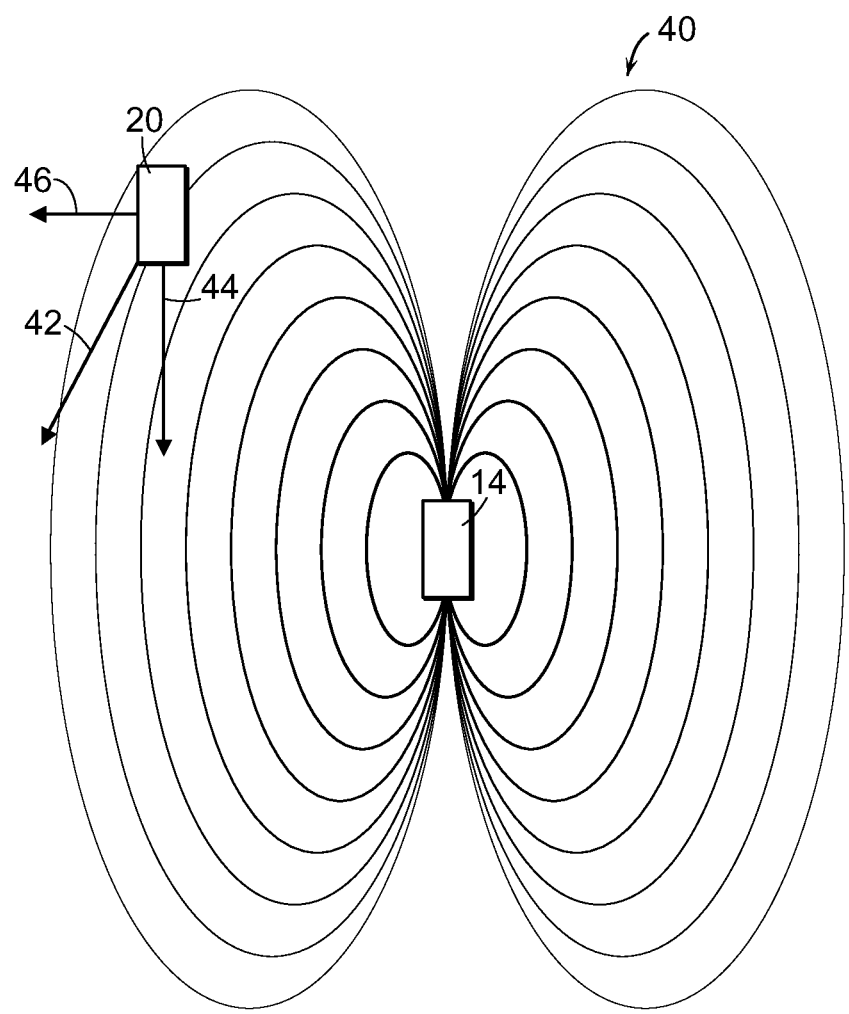
FIG. 4 shows the magnetic field components of the magnetic field vector at a sensor of the vehicle of FIG. 1.

The magnetic field 40 of magnet 14, and the magnetic field vector 42, and its components, at sensor 20 are shown in FIG. 4. As seen here, the magnetic field component 44 that is perpendicular to the plane wherein the sensors is arranged is substantially higher than the magnetic field component 46 that is parallel to the plane.

It should be noted that the embodiments shown and described only serve as example embodiments of the invention, and that the invention is not limited to these embodiments. Many modifications of and variations on the embodiments shown and described are possible without departing from the scope of the present invention. For example, it is without limitation, possible to combine embodiments shown and described. The scope of protection sought is therefore only determined by the following claims.

The invention claimed is:

1. A system for determining a position of a vehicle comprising:
   a plurality of sensors for measuring a magnetic field strength of a magnet; and
   a digital signal processor;
   wherein the plurality of sensors are arranged in a two-dimensional array that defines a plane substantially parallel to a surface where the magnet is positioned, and all of the sensors of the plurality of sensors are evenly interspersed in both dimensions;
   wherein the system is configured to determine a position of the magnet with respect to the plurality of sensors;
   wherein the system is free of sensors for measuring a magnetic field strength of a magnet outside the two-dimensional array; and
   wherein the plurality of sensors are each configured such that their sensitivity for a magnetic field component perpendicular to the plane within which the plurality of sensors is arranged is greater than zero and is substantially higher than their sensitivity for a magnetic field component parallel to the plane, which is also greater than zero.

2. The system according to claim 1, further configured to fit the magnetic field strengths measured by the plurality of sensors to a spatial model of the magnetic field of the magnet.

3. The system according to claim 1, wherein the system is arranged to decode information that is coded by a mutual arrangement of a group of magnets in a surface and/or a polarity of individual magnets in the group of magnets.

4. A vehicle comprising a system for determining a position of a vehicle comprising:

a plurality of sensors for measuring a magnetic field strength of a magnet; and a digital signal processor;

wherein the plurality of sensors are arranged in a two-dimensional array that defines a plane substantially parallel to a surface where the magnet is positioned, and all of the sensors of the plurality of sensors are evenly dispersed in both dimensions; and wherein the system is configured to determine a position of the magnet with respect to the plurality of sensors, and wherein the system is free of sensors for measuring a magnetic field strength of a magnet outside the two-dimensional array, and wherein the plurality of sensors are each configured such that their sensitivity for a magnetic field component perpendicular to the plane within which the plurality of sensors is arranged is greater than zero and is substantially higher than their sensitivity for a magnetic field component parallel to the plane, which is greater than zero.

5. A method for determining a position of a vehicle, comprising the steps of:

acquiring from a plurality of sensors in a system magnetic field strengths measured by the plurality of sensors; and determining the position of a sensed magnet with respect to the plurality of sensors;

wherein the plurality of sensors are arranged in a two-dimensional array and all of the sensors of the plurality of sensors are evenly dispersed in both dimensions, and wherein the system is free of sensors for measuring a magnetic field strength of a magnet outside the two-dimensional array, and wherein the plurality of sensors are each configured such that their sensitivity for a magnetic field component perpendicular to the plane within which the plurality of sensors is arranged is greater than zero and is substantially higher than their sensitivity for a magnetic field component parallel to the plane, which is greater than zero.

6. The method according to claim 5, wherein the position of the sensed magnet is determined by fitting the acquired magnetic field strengths to a spatial model of the magnetic field of the sensed magnet.

7. The method according to claim 5, further comprising the step of fitting the magnetic field strengths measured by the plurality of sensors to a spatial model of the magnetic field of the sensed magnet.

8. The method according to claim 5, further comprising the step of decoding information that is coded by a mutual arrangement of a group of magnets in a surface and/or the polarity of the individual magnets in the group of magnets.

9. The system according to claim 2, wherein the system is further configured to decode information that is coded by means of a mutual arrangement of a group of magnets in a surface and/or the polarity of the individual magnets in the group of magnets.

10. The system according to claim 1, wherein the system is further configured to decode information that is coded by means of a mutual arrangement of a group of magnets in the surface and/or a polarity of the individual magnets in the group of magnets.

11. The system according to claim 1, further comprising means for fitting the magnetic field strengths measured by the plurality of sensors to a spatial model of the magnetic field of a magnet, and wherein the system is further configured to decode information that is coded by means of a mutual arrangement of a group of magnets in the surface and/or the polarity of the individual magnets in the group of magnets.

12. The vehicle of claim 4, wherein the system is further configured to fit the magnetic field strengths measured by the plurality of sensors to a spatial model of the magnetic field of the magnet.

13. The vehicle of claim 4, wherein the system is arranged to decode information that is coded by means of a mutual arrangement of a group of magnets in the surface and/or the polarity of the individual magnets in the group of magnets.

14. The vehicle of claim 4, wherein the system is further configured to fit the magnetic field strengths measured by the plurality of sensors to a spatial model of the magnetic field of the magnet, and wherein the system is arranged to decode information that is coded by means of a mutual arrangement of a group of magnets in a surface and/or a polarity of the individual magnets in the group of magnets.

15. The method according to claim 5, further comprising the step of:

determining the position of the vehicle using the determined position of the sensed magnet with respect to the plurality of sensors.

16. A system for determining a position of a vehicle comprising:

a plurality of sensors arranged in a two dimensional array that defines a plane substantially parallel to a surface where the magnet is positioned, for measuring a magnetic field strength of a magnet, wherein all of the sensors of the plurality of sensors are evenly interspersed in both dimensions;

a plurality of magnets provided in a surface suitable for the vehicle to drive on; and a digital signal processor configured to determine a position of a selected magnet with respect to the plurality of sensors, wherein the system is free of sensors for measuring a magnetic field strength of a magnet outside the two-dimensional arrays, and wherein the plurality of sensors are each configured such that their sensitivity for a magnetic field component perpendicular to the plane within which the plurality of sensors is arranged is greater than zero and is substantially higher than their sensitivity for a magnetic field component parallel to the plane, which is greater than zero.

17. The system according to claim 16, wherein positions of multiple magnets are determined at one time from measurements by the two-dimensional array of sensors.

18. The system according to claim 16, wherein the magnets are positioned in a grid-like pattern.

* * * * *